United States Patent [19]
Grossman

[11] 3,833,094
[45] Sept. 3, 1974

[54] SHOCK ABSORBER WARNING SYSTEM

[76] Inventor: Sidney Grossman, 180 Samoset Ave., Quincy, Mass. 02160

[22] Filed: Feb. 5, 1973

[21] Appl. No.: 329,402

[52] U.S. Cl.............. 188/1 A, 188/322, 200/52 R, 340/52 R
[51] Int. Cl............................................. F16d 63/00
[58] Field of Search.................... 188/322, 266, 1 A; 280/6 H, 124 F; 200/52 R, 61.24; 340/52 R

[56] References Cited
UNITED STATES PATENTS

| | | | |
|---|---|---|---|
| 1,429,411 | 9/1922 | Davidson | 340/52 R |
| 2,779,013 | 1/1957 | Chotro | 340/52 R |
| 2,816,186 | 12/1957 | Rands et al. | 200/52 R |
| 3,186,730 | 6/1965 | Angell | 280/6 H X |
| 3,687,483 | 8/1972 | Gull et al. | 280/124 F |

Primary Examiner—George E. A. Halvosa
Attorney, Agent, or Firm—Morse, Altman, Oates & Bello

[57] ABSTRACT

An alarm system is provided for use on motor vehicles to monitor the condition of the vehicle's shock absorbers. The system includes a spring-loaded switching device mounted to each shock absorber and connected through a circuit to an alarm such as a light or buzzer which may be installed on the vehicle's dashboard. The switching device closes if the shock absorber telescopes beyond its normal operating range.

5 Claims, 2 Drawing Figures

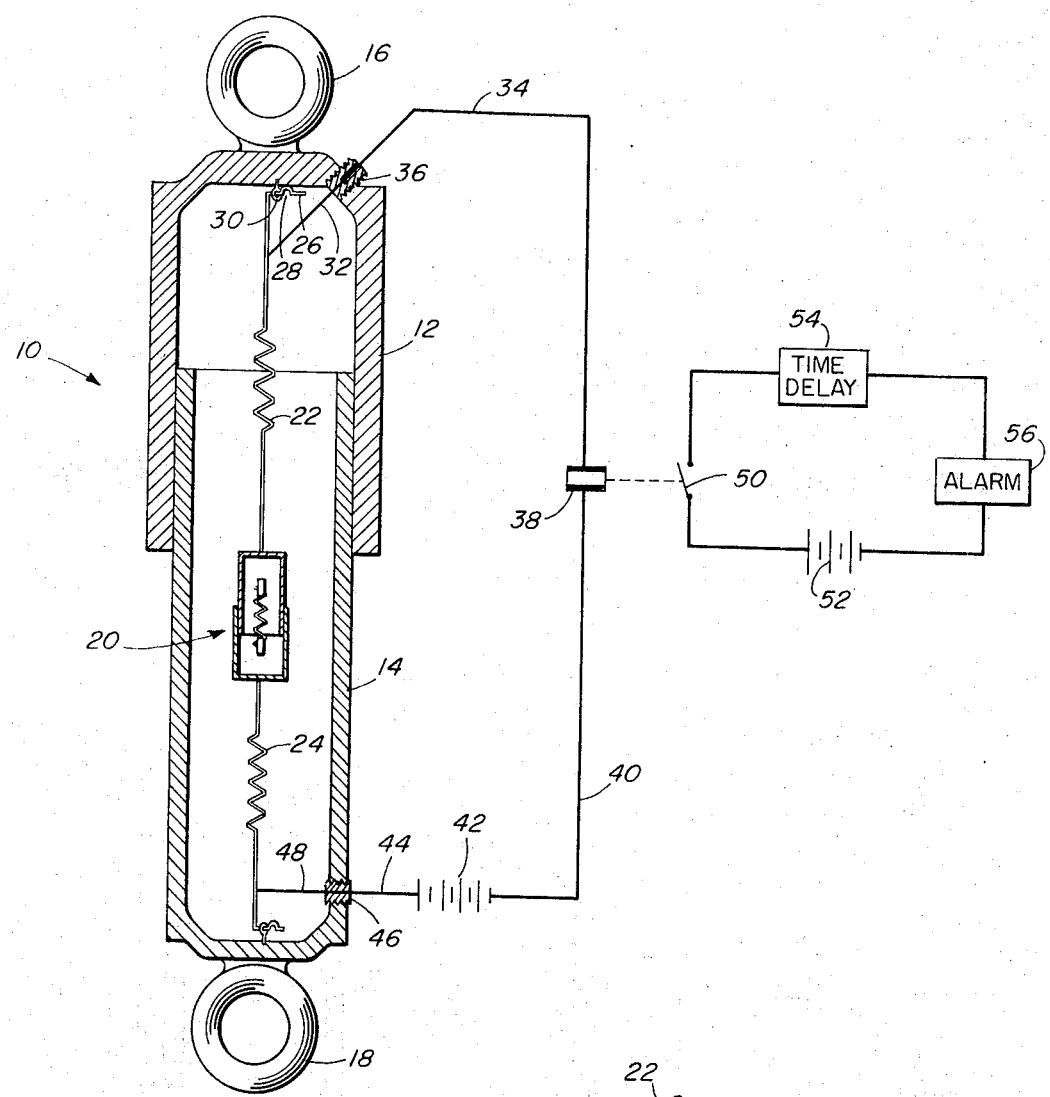
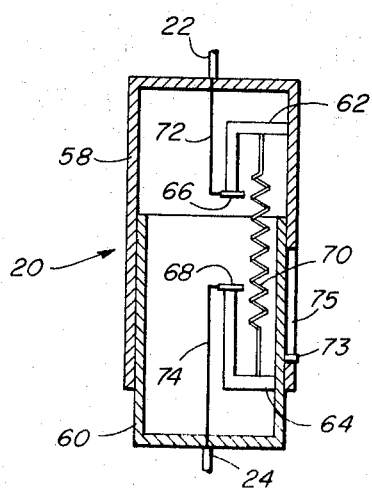
FIG. 1
FIG. 2

SHOCK ABSORBER WARNING SYSTEM

BACKGROUND OF THE INVENTION

1. Field of the Invention

This invention relates generally to shock absorber warning systems and more particularly is directed towards an automatic warning system adapted to provide a signal to a driver when the shock absorbers for the vehicle become excessively worn.

2. Description of the Prior Art

Shock absorbers used on motor vehicles serve to dampen the action of the springs which are employed to cushion the ride of the vehicle. Without the shock absorbers, the springs would oscillate easily and for a long period of time, producing an uncomfortable and somewhat uncontrolled ride. The shock absorbers thus limit the action of the springs and serve to provide a firmer and more controlled ride.

A shock absorber normally comprises a pair of telescopically connected cylinders which may be of pneumatic or hydraulic operation. A properly functioning shock absorber provides a controlled dampening action when the two parts telescope at a controlled rate according to the motion of the suspension system responding to the irregularities of the road. However, shock absorbers tend to wear with mileage or, at times, may be defective for one reason or another. Such worn or defective shock absorbers reciprocate too easily to provide any effective dampening action and, as a result, the ride deterioates and control over the vehicle is reduced.

Heretofore, the determination of the condition of shock absorbers has been somewhat subjective, either wholly ignored by the driver or left to the opinion of a mechanic of unknown technical competence.

Accordingly, it is an object of the present invention to provide a new and improved system adapted to provide automatically a positive indication of the condition of motor vehicle shock absorbers.

SUMMARY OF THE INVENTION

FIG. 1 is a somewhat schematic sectional view in side elevation of a shock absorber monitoring system made according to the invention, and, FIG. 2 is a sectional detail view of the switching device employed in the FIG. 1 system.

DETAILED DESCRIPTION OF THE PREFERRED EMBODIMENT

Referring now to the drawings, the reference character 10 generally indicates a shock absorber comprised of telescopically connected tubular, cylindrical sections 12 and 14. The shock absorber may be of the pneumatic or hydraulic type but for purposes of illustration the invention is shown in connection with a simple telescopically connected pair of tubes. Typically, each section is provided with an eye 16 and 18 at the ends therof for connection to the vehicle chassis and the suspension system. In practice, the shock absorber is mounted within a coil spring where a coil spring suspension is employed. Where a leaf spring system is employed, the shock absorber will be mounted between the spring and the frame. In any event, the function of the shock absorber is to dampen the action of the spring whether the springs be in the form of coil springs, leaf springs, torsion bars or the like.

Normally, the sections of the shock absorber will reciprocate with respect to one another, telescoping in and out according to the motions of the wheels responding to irregularities in the road surface and load factors. The telescopic action normally is limited to a short range, particularly where the road surface is relatively smooth and the shock absorbers are in good condition. However, if the shock absorber becomes excessively worn, the sections reciprocate rather freely and the damping action is attenuated. Under these conditions the telescopic sections reciprocate in and out beyond a desired range and have little affect in controlling the oscillation of the springs.

In accordance with the present invention, excessive motion of the shock absorber sections is monitored by means of a switching device 20 mounted parallel to the axis of the shock absorber and forming part of a monitoring circuit adapted to warn the driver of the condition of the shock absorber. The switching device 20, in the illustrated embodiment, is mounted coaxially within the telescopic sections 12 and 14 in a spring-loaded suspension arrangement. The device forms a part of a relay alarm circuit and alarm adapted to warn the driver whenever the motion of the sections 12 and 14 exceeds predetermined limits.

The switching device 20 is suspended between the two sections 12 and 14 by means of electrically conductive springs 22 and 24. The upper spring 22 is connected at its lower end to the upper end of the switching device 20 and at its upper end is connected to the top wall of the shock absorber section 12. As best shown in FIG. 1 the upper end of the spring 22 is formed with a right angular bent leg portion 26 having an indent 28 formed therealong. An eye 30 is secured to the top wall of the section 12 and engages the leg 26. The indent 28 serves as a stop so as to latch the upper end of the spring in place. The lower end of the spring is connected to the switch element by swaging, soldering, crimping or any other suitable means. The spring 24 is connected to the switching device 20 and to the section 14 in a manner similar to the spring 22 in the upper section but in an inverted position.

The springs 22 and 24 hot only support the switching arrangement 20 but also form part of the monitoring circuit. This circuit includes a lead 32 connected to the spring 22 and to a lead 34 through a screw coupling 36, threaded to a tapped opening in the upper end of the section 12. The lead 34 connects to the coil of a relay 38 which is also connected to a lead 40 attached to a battery 42. The battery 42, in turn, is connected by a lead 44 through a screw coupling 46 to a lead 48 which, is connected to the spring lead 24 terminating at the switching device 20. When the switching device 20 closes upon an excessive telescopic action of the sections 12 and 14, a circuit will be completed between the battery and the relay 38 and this, in turn, will close the relay switch 50. The relay switch 50 will thus complete a circuit from a battery 52 through a time delay device 54 to an alarm 56. The alarm 56 may be either an audio alarm, such as a buzzer, or a visible alarm such as a light, or a combination of both. Preferably, the alarm should be located in proximity to the driver and conveniently may be mounted on the dashboard of the vehicle. The time delay device 54 serves to introduce a delay factor to prevent intermittent signals from actuating the alarm as may be occasioned by an excessively bumpy road, for example, where the shock absorber may telescope beyond its usual range only for a short period of time. If the shock absorber is worn or defective, the excess movement of the sections will be more prolonged and will be sufficient to actuate the alarm.

The switching device 20 is best shown in FIG. 2 and is comprised of telecopically connected upper and lower housing sections 58 and 60, respectively. Each housing section includes a post 62 and 64 at the ends of which are mounted electrical contacts 66 and 68 in opposing relation. The posts 62 and 64, along with the housing sections 58 and 60, are urged together by means of a coil spring 70 which, under normal conditions, are maintained in the open or separated condition of FIG. 2 by means of the overriding springs 22 and 24 by means of leads 72 and 74. The device functions in such a manner that the spring 70 will pull the contacts 66 and 68 against one another to complete a circuit only if the shock absorber sections 12 and 14 telescope into one another to an extent sufficient to overcome the force of the springs 22 and 24. Under normal conditions, the fixed contacts 66 and 68 will be kept separated. In order to prevent the housing sections 58 and 60 from separating, a pin 73 extends from one wall of the housing section 60 and rides in a cooperating slot 75 formed in one wall of the housing section 58.

While the invention has been described in connection with the illustrated shock absorber system, numerous modifications will appear to those skilled in the art. For example, the time delay device may be incorporated in the relay 38. Also, instead of mounting the switching device 20 within the body of the shock absorber, it may be mounted exterior thereto. This would be particularly appropriate for hydraulic type shock absorbers. While the system is particularly suitable for shock absorbers in motor vehicles, it may also be used to advantage in other machines employing shock absorbers of the type disclosed.

Also, additional switch contacts may be added in such a manner as to be actuated by excessive extension of the telescopic shock absorber parts.

Having thus described the invention what I claim and desire to obtain by Letters Patent of the United States is:

1. A system for monitoring the condition of a shock absorber having a pair of telescopically connected sections, comprising
   a. switch means mounted to said shock absorber and adapted to be closed by an excessive telescopic action of said sections,
   b. alarm means operatively connected to said switch means and adapted to be actuated upon closing of said switch means,
   c. first spring means connected to said switch means for urging said switch means into a closed position and second spring means connected to said switch means and to said sections for urging said switch means into an open position, said first and second spring means maintaining said switch means open during normal movement of said sections and closed during abnormal movement thereof,
   d. said switch means including a pair of movable contacts and said second spring means including electrically conductive leads connected between said contacts and opposite ends of said sections.

2. A system according to claim 1 including time delay means between said switch means and said alarm means.

3. A system according to claim 1 including a relay operatively connected to said switch means and operatively connected to said alarm means and time delay means connected to said alarm means for delaying actuation of said alarm means for a predetermined period.

4. A system according to claim 1 including an eye mounted within said sections at opposite ends thereof and the ends of said leads are formed with bent legs having a detent formed therein for engagement with each of said eyes.

5. A system according to claim 4 including a telescopic housing supporting said contacts and said first spring means.

* * * * *